Oct. 10, 1967 J. A. DOBB 3,346,078
VEHICLE BRAKE SYSTEM AND METHOD
Filed Feb. 14, 1966
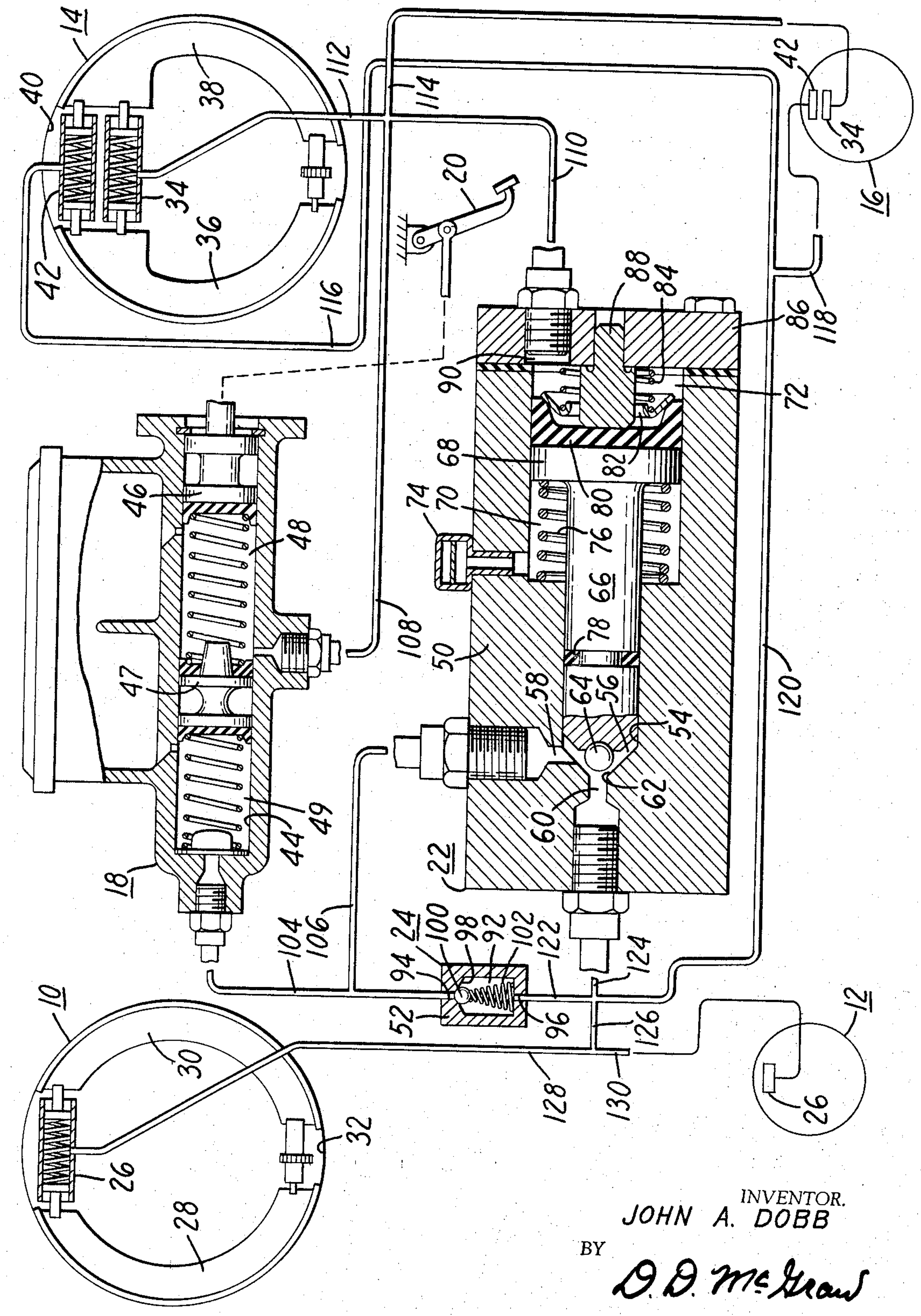
INVENTOR.
JOHN A. DOBB
BY D. D. McGraw
ATTORNEY United States Patent Office 3,346,078
Patented Oct. 10, 1967

3,346,078
VEHICLE BRAKE SYSTEM AND METHOD

John A. Dobb, Walled Lake, Mich., assignor to General Motors Corporation, Detroit, Mich., a corporation of Delaware Filed Feb. 14, 1966, Ser. No. 527,302
10 Claims. (Cl. 188—152)

ABSTRACT OF THE DISCLOSURE

A vehicle braking system using a dual master cylinder with one pressurizing chamber connected to a first fluid circuit actuating one set of vehicle brakes and a control assembly, a second master cylinder pressurizing chamber pressurizing a second fluid circuit connected to the control assembly, and a third fluid circuit pressurized by braking action of the set of brakes initially pressurized by the one master cylinder pressurizing chamber. The third circuit also includes the wheel cylinders of another set of brakes which are pressurized when the third circuit is pressurized. Under normal operation the first circuit actuates the first set of brakes and this brake actuation pressurizes the third circuit to actuate the other set of brakes. The second fluid circuit will normally act to initially pressurize the third circuit but is prevented from further pressurization of the third circuit upon a predetermined amount of pressurization of the first circuit unless the pressure in the third circuit falls to a predetermined level below that generated in the second circuit. Should the first circuit fail to pressurize the one set of brakes, pressurization of the third circuit will cause pressurization of wheel cylinders to actuate both sets of brakes through the third circuit, with appropriate valve means permitting this result. Should the second circuit fail to pressurize, all of the sets of brakes will be pressurized through action of only the first and third circuits. Should the third circuit develop a leak so that it cannot be pressurized, the first circuit will still pressurize the one set of brakes.

The invention relates to a brake system for a vehicle in which a master cylinder assembly pressurizes brake fluid to actuate the rear vehicle brakes, generating braking torque the reaction of which acts through a pressurizing mechanism to generate brake fluid pressure delivered to the front wheel brakes. The invention more particularly relates to a system of the type disclosed and claimed in United States patent application Ser. No. 444,654, filed Apr. 1, 1965, by Walter H. Zimmerman and issued Feb. 14, 1967, as Patent No. 3,303,909.

A system embodying the invention utilizes a dual master cylinder having tandem pressurizing pistons, the forward one of which floats within the master cylinder chamber. The rear pressurizing chamber of the master cylinder assembly actuates the rear vehicle brakes under normal conditions and also actuates a control assembly which normally prevents actuation of the front vehicle brakes by pressure from the forward master cylinder pressurizing chamber. The torque reaction of the rear brakes cts through a pressure generating arrangement to generate and apply brake fluid pressure to the front brakes through a secondary circuit. An auxiliary circuit, normally blocked off by the control assembly under influence of rear brake actuating pressure, is connected to the forward master cylinder pressurizing chamber and the front brake pressure line through a check valve. If for some reason torque reaction at the rear wheels is negligible or non-existent, and therefore pressure generated thereby is negligible or non-existent, the fluid pressure generated in the forward master cylinder pressurizing chamber will overcome the check valve and apply the front brakes. To this extent the system is the same as that disclosed and claimed in the above noted Patent No. 3,303,909. In the modified brake assembly which is herein disclosed and claimed, the control assembly is rendered inoperative in the event of a rear brake line failure, and the forward master cylinder pressurizing chamber is connected to the front brake hydraulic system, therefore permitting the auxiliary pressurizing circuit energized by the forward master cylinder fluid pressurizing chamber to directly apply the front brakes. It will also supply some braking pressure to the rear brakes through the secondary circuit connected to the torque reaction pressure generating mechanism. If there is a failure in the front brake line, the primary fluid circuit will continue to apply the rear brakes.

The system also provides for fluid make-up and thermal relief for the front brakes and the rear brake pressure generating mechanism through the auxiliary circuit connected to the forward master cylinder pressurizing chamber. A valve in the control assembly is open when the brake pedal is not depressed, placing the front brake circuit and the auxiliary fluid circuit in fluid communication.

In the drawing:

The single figure is a schematic representation of a vehicle brake system embodying the invention, with parts broken away and in section.

The vehicle brake system includes the front brake assemblies 10 and 12, rear brake assemblies 14 and 16, a master cylinder assembly 18, a brake pedal 20, valve mechanism including the valve assembly 22 and the check valve assembly 24, and fluid conduits connecting these elements. Each front brake is illustrated as being of the duo-servo type with a wheel cylinder 26 actuating the brake shoes 28 and 30 into engagement with the brake drum 32 to provide vehicle braking. The rear brake assemblies are similarly constructed, except for differences noted below. Other types of brake assemblies may be utilized. For example, the front brakes may be disc brakes. Similarly, the rear brakes may be disc brakes. When the rear brakes are disc brakes, it is desirable to use a self-energizing or servo disc brake construction, although this is not absolutely necessary, since other brake torque reaction pressure generating mechanisms may be used.

Each rear brake assembly illustrated in the drawing is provided with a wheel cylinder 34, brake shoes 36 and 38, and a brake drum 40. The rear brakes are constructed as duo-servo brakes so that a mechanical servo action is obtained when the brakes are actuated. Additionally, each brake assembly is provided with a pressurizing cylinder assembly 42 which is located adjacent a wheel cylinder 34 and may be constructed in much the same manner as the wheel cylinder. The pressurizing cylinders 42 are preferably located diametrically outside the wheel cylinders 34 since the mechanical servo action of the brake shoes during brake actuation is greater toward the outer ends of the shoes. The pressurizing cylinders provide means for generating a fluid pressure in response to actuation of the rear brake assembly by the wheel cylinders 34.

The master cylinder assembly 18 is a dual master cylinder assembly of a type used in automotive vehicles which have split or dual brake systems. The assembly 18 has a cylinder bore 44 in which a rear pressurizing piston 46 is reciprocably moved by the vehicle operator through brake pedal 20 to pressurize fluid in the rear pressurizing chamber 48. A floating pressurizing piston 47 is also reciprocably received in bore 44 forward of chamber 48, and forward of the forward wall of that chamber. The forward end of the master cylinder assembly therefore is provided with a forward pressurizing chamber 49.

The valve mechanism is schematically illustrated as being in two parts including the valve assembly 22 and the check valve unit 24. However, the valve mechanism may be provided in a unitary body so that the valve assembly housing 50 and the check valve housing 52 may be a common housing.

The housing 50 of valve assembly 22 has a bore 54 formed therein. One end of the bore forms a valve chamber 56 which has an inlet port 58 and an outlet port 60. The end of bore 54 adjacent port 60 is formed to provide a valve seat 62 for the ball valve 64 contained in the valve chamber. A piston 66 provides valve closing means for valve 64 and is reciprocably received in bore 54. One end of the piston provides a seat for the ball valve 64. Due to the ramp construction of the end of piston 66 and of the valve seat 62, and the walls of the valve chamber 56, ball valve 64 is normally open. It is closed only when piston 66 moves to the left to hold it against the valve seat 62.

Piston 66 has a head 68 received in an enlarged section of bore 54. The enlarged bore section receiving head 68 provides a chamber 70 on one side of the head and a chamber 72 on the other side of the head. Chamber 70 is vented to atmosphere by vent 74 to prevent occurrence of a fluid lock condition. A compression spring 76 is so received in chamber 70 as to urge the piston 66 to the right as seen in the drawing, thereby tending to hold the ball valve 64 in the open position. A seal 78 engages bore 54 and piston 66 so as to seal chambers 56 and 70 from each other. A sealing cup 80 is provided adjacent the piston head 68 in chamber 72. A spring seat and cup expander 82 acts on cup 80 to keep the cup lip engaged with the bore wall of chamber 72 and also receives one end of spring 84. The other end of spring 84 is positioned against the side of the bore cover plate 86, which closes the open end of chamber 72. A piston stop pin 88 is suitably mounted in plate 86 so as to provide a stop for piston head 68 and sealing cup 80. Spring 84 is lighter than spring 76 so that the piston head is normally positioned as shown in the drawing when there is little or no fluid pressure in chamber 72. A pressure supply port 90 is provided in cover plate 86 and connects with chamber 72.

The check valve assembly 24 has a valve chamber 92 formed in the housing 52. Chamber 92 has a first port 94 and a second port 96. Port 94 is provided with a valve seat 98 against which the check valve 100 is held by a compression spring 102. Spring 102 is so calibrated in relation to the area of valve 100 exposed to pressure in port 94 when the valve is seated against seat 98 as to open at a predetermined pressure differential by which the pressure in port 94 exceeds the pressure in chamber 92 and port 96.

The auxiliary fluid pressure circuit, connected with and including the forward master cylinder pressurizing chamber 49 and its reservoir, also includes the forward master cylinder pressure outlet conduit 104, which is fluid connected to the check valve port 94 and to conduit 106. Conduit 106 is fluid connected to the inlet port 58 of the valve assembly 22.

The primary fluid pressurizing circuit, connected with and including rear master cylinder pressurizing chamber 48 and its reservoir, also includes the rear master cylinder pressure outlet conduit 108, which is connected at a junction with conduits 110, 112 and 114. Conduit 110 is also connected to port 90 of the valve assembly 22. Conduits 112 and 114 connect conduit 108 with the rear brake wheel cylinders 34, which constitute first fluid pressure actuated brake energizing means.

Another fluid pressure circuit includes conduits 116 and 118 leading from the pressurizing cylinder assemblies 42, providing a secondary fluid pressurizing means, and joining to provide a single conduit 120 which is in turn connected to port 96 of the check valve assembly 24 by conduit 122, and to port 60 of the valve assembly 22 by the conduit 124. Check valve assembly 24 provides normally closed pressure differential responsive valve means.

Conduit 120 is also connected by conduit 126 to conduits 128 and 130 which are in turn connected to the front wheel cylinder assemblies 26, which constitute second fluid pressure actuated brake energizing means. If the check valve housing 52 is integral with the housing 50 of the valve assembly 22, the check valve port 94 may be connected with conduit 106 and the check valve port 96 may be connected with the conduit 124 instead of as shown.

The system is illustrated in the brake released position. When the vehicle is moving, and the operator desires to apply the vehicle brakes, he depresses the brake pedal 20. The brake pedal linkage acts on the rear master cylinder piston 46 to pressurize brake fluid in the chamber 48. This fluid pressure is conducted through conduit 108 to the rear wheel cylinder assemblies 34 and port 90 of valve assembly 22. The pressure also acts on floating piston 47 so that pressure is likewise generated in the forward master cylinder pressurizing chamber 49. The latter generated pressure is conducted through conduits 104 and 106 to inlet 94 of the check valve assembly 24, and port 58 of the valve assembly 22.

As is well known, some fluid pressure is required to move the brake shoes outwardly against their retracting springs so that they contact the drums, when internally expanding drum brakes are utilized. In some types of disc brakes, some brake shoe extending pressure is also required, while in others the brake shoes lightly contact the braking disc. Thus, while the type of brake utilized will cause slightly different operating pressures to be considered, the principle with which the invention is concerned may be illustrated with any suitable type of brake. Therefore, further description will deal only with duo-servo drum brakes.

The pressure initially built up in chamber 48, and conducted to the above noted port and rear wheel cylinders, acts to expand the rear brake shoes 36 and 38 into contact with the brake drums 40. The pressure entering port 90 acts against the piston head 68 through the sealing cup 80 so as to oppose the force of spring 76. The pressure entering port 58 passes through chamber 56 and out port 60 and into the front brake wheel cylinders through conduits 124, 126, 128 and 130, as well as into the pressurizing cylinder assemblies 42 of the rear brakes. The pressure also enters chamber 92 of the check valve assembly 24, so that the fluid pressures on both sides of ball check valve 100 are equal and the the ball check valve remains closed. Thus the master cylinder generated pressures initially actuate all of the wheel cylinders to move the brake shoes of all of the brake assemblies toward their respective brake drums. The area of piston head 68 and the force of spring 76, as well as the area of the other end of piston 66, are preferably so calibrated as to permit the piston to move to the left under the force of generated pressure in chamber 72 to seat valve 64 against valve seat 62 at a predetermined pressure. This pressure may be approximately the pressure required to move the brake shoes outwardly into engagement with the brake drums. While the pressure required to engage the shoes to the drum varies considerably in different installations, it may fall within the range of 50 to 75 p.s.i., by way of example. At this time fluid pressure in port 58 is disconnected from fluid pressure in port 60, and therefore the front brake actuating fluid pressure circuit is pressure disconnected from the forward master cylinder pressurizing chamber 49. Pressure generated by the master cylinder in chamber 49 therefore does not further expand the front wheel cylinders 26 or the pressurizing cylinders 42 of the rear brakes.

As the vehicle operator continues to depress the brake pedal 20, fluid pressure is built up in the rear brake wheel cylinders so that the brake shoes 36 and 38 are further forced against their respective drums and rear wheel braking action takes place. The brake torque or mechanical servo action of the rear brakes generates a reaction force which is exerted on one piston of each of the pressurizing cylinder assemblies 42. When the vehicle is moving in the forward direction, this reaction force is exerted by the secondary shoes 38. Since, in the initial application of brake pressure, pressurizing cylinder assemblies 42 were expanded concurrently with wheel cylinders 34, the piston operatively engaged by the primary shoe 36 followed that shoe outwardly and remained in that position. The reaction force causes pressure to be generated in the pressurizing cylinders 42 and this pressure is transmitted throughout the secondary fluid pressurizing circuit, including conduits 122, 124, 126, 128 and 130 to the front wheel cylinder assemblies 26, the check valve assembly 92, and the port 60 of the valve assembly 22. Thus the rear brakes are applied by master cylinder pressure as a first fluid pressure source, and the front brakes are applied by the resultant reaction force generated by the applications of the rear brakes and acting on the pressurizing cylinder assemblies 42 as a second fluid pressure source. Since the secondary pressure is exerted on valve assembly 22 only against the relatively small area of ball valve 64 closing port 60, this pressure is effectively blocked from the forward master cylinder pressurizing chamber 49 and is not free to act on the master cylinder piston and push the pedal back against the driver's foot. The brake feel obtained by the driver is only that required to push and hold the wheel cylinders 34 in the desired brake engaged condition. Therefore, the force required to actuate the brake system by the operator is considerably less. The braking action of the front brakes is obtained from a power source other than the power source required to actuate the master cylinder. However, the pressure actuating the front wheel brakes is related to the power required to actuate the rear wheel brake since the mechanical reaction force of the servo action of the rear brakes is related to the amount of rear wheel brake braking force.

If for some reason, such as the failure of the pressurizing cylinder assembly 42 to pressurize fluid, insufficient pressure is generated in the secondary circuit, a pressure differential is applied to the check valve 100 of the valve assembly 24 which is sufficient to overcome the force of valve spring 102. This spring force is calibrated to a predetermined pressure differential for this purpose. Pressure from the forward master cylinder pressurizing chamber then enters chamber 92 through inlet 94 and passes out through the check valve port of inlet 96 to the secondary circuit and actuates the front wheel cylinders. The pressure is also transmitted through conduit 120 to the pressurizing cylinder mechanisms 42 of the rear wheel brakes and will tend to further apply the rear brakes, utilizing the assembly 42 as wheel cylinders instead of pressure generating cylinders.

By a different arrangement of spring forces of the spring 102 and spring 76, a somewhat different and effective operation may also be obtained. By utilizing a very light spring 102 in the check valve assembly 24, which, by way of example but not by way of limitation, may set up a pressure differential of 5 p.s.i. instead of 150 p.s.i., another method of operation may be obtained. Actuation of the master cylinder 18 generates pressure in chamber 49 which overcomes the light resistance of check valve spring 102 so that this pressure is transmitted to the secondary circuit through the check valve assembly at an early stage. Under this condition of operation, spring 76 may also be lighter, so that valve 64 is closed at the time or shortly after the time, based on a pressure buildup, that valve 100 opens. Thus the pressure generated in the forward master cylinder pressurizing chamber 49 initially expands the front brake wheel cylinders and the rear brake pressurizing cylinders 42 by flowing through the check valve assembly 24. As the rear brakes are actuated and the mechanical servo action occurs, the secondary circuit pressure is built up by the pressurizing cylinders 42. When it approaches the pressure generated in master cylinder chamber 49, the check valve 100 closes and the secondary pressure generated by the pressurizing cylinders 42 actuates the front brakes through the front wheel cylinders 26. As before, the higher secondary pressure thus generated acts on valve 64 and therefore on piston 66 across the small area of port 60. This area is so small that the resultant force is insufficient to move the piston 66 to unseat the valve 64. Thus the higher secondary pressure cannot act to transmit brake reaction force to the master cylinder piston 46, and the operator is not required to overcome this reaction force in order to apply and hold the brakes. Should the secondary circuit pressure generated by the pressurizing cylinders 42 be less than the pressure generated in the forward master cylinder pressurizing chamber 49 by the pressure differential set up by spring 102 (in the above example, 5 p.s.i) check valve 100 will again open and pressure from the forward pressurizing chamber of the master cylinder will be supplied to the secondary fluid pressure system and will again pressurize the front wheel cylinders and the pressurizing cylinder assemblies 42 of the rear brakes.

When the brakes are released by the pedal 20, the pressure in each of the master cylinder pressurizing chambers is diminished and the hydraulic servo braking force on the rear wheel brakes is likewise diminished. It then follows that the mechanical servo action generating the reaction force which pressurizes fluid in pressurizing cylinders 42 is also diminished, thereby diminishing the pressure in the secondary circuit to the front wheel brakes. The total braking force acting on the vehicle is, therefore, diminished. When the primary pressure from the master cylinder 18 is sufficiently diminished, spring 76 moves piston head 68 to the right, opening valve 64 and thereby reconnecting the front brake or secondary circuit and the forward master cylinder pressurizing chamber 49 through valve chamber 56, and conduits 106 and 104. The wheel cylinders and the pressurizing cylinders of the front and rear brakes are therefore permitted to decrease in volume as the brake shoes are retracted and the excess fluid is returned to the master cylinder chambers and the master cylinder reservoir.

A brake system has thus been provided which permits applying both the front and rear brakes with auxiliary and primary pressures until the secondary pressure developed by the torque output of the rear brake exceeds the auxiliary pressure, after which the higher secondary line pressure actuates the front brakes. At the same time the advantages of a dual brake system are retained and the vehicle operator is required to overcome less reaction force to obtain full braking action. The valve mechanism in the system, together with the manner of connection of the master cylinder assembly, permits this mode of operation. It also vents the front brake fluid pressurizing circuit to the master cylinder between brake applications so as to prevent pressure buildup due to temperature variations as well as to compensate for brake fluid loss. It eliminates the complete dependence of the front brakes on the performance of the rear brakes. Thus if the rear brakes should completely fade or otherwise fail, the front brakes may still be applied and their braking action will not be lost. At the same time additional braking force is applied to the rear brakes through the wheel cylinder and pressurizing cylinder assemblies 42 in those brakes.

What is claimed is:

1. A vehicle brake system for a vehicle, said system comprising in combination:

a front wheel brake assembly and a rear wheel brake assembly, a brake master cylinder having a first fluid pressurizing chamber and a second fluid pressurizing chamber, a first wheel cylinder for actuating one of said wheel brake assemblies, a second wheel cylinder for actuating the other of said wheel brake assemblies, a third wheel cylinder and pressurizing chamber assembly in said other wheel brake assembly, first normally open fluid pressure closed valve means having a fluid pressure valve closing chamber and a valve inlet and a valve outlet, second normally closed fluid pressure differential opened valve means having a valve inlet and a valve outlet, a first fluid pressurizing circuit comprising said first fluid pressurizing chamber and said second wheel cylinder and said fluid pressure valve closing chamber and fluid conduit means fluid connecting the same, a second fluid pressurizing circuit comprising said second fluid pressurizing chamber and said first valve means valve inlet and said second valve means valve inlet and fluid conduit means connecting the same, and a third fluid pressurizing circuit comprising said first wheel cylinder and said third wheel cylinder and pressurizing chamber assembly and said first valve means valve outlet and said second valve means valve outlet and fluid conduit means connecting the same, said third wheel cylinder and pressurizing chamber assembly pressurizing fluid in said third fluid pressurizing circuit by brake reaction forces generated by braking action of said other brake assembly in one brake operational mode with said first and second valve means being closed, said second fluid pressurizing chamber pressurizing said second circuit and cooperating with fluid pressure in said third circuit to selectively open said second valve means and pressurize said third circuit in another brake operational mode to apply said one brake and to apply braking force to said other brake through said third wheel cylinder and pressurizing chamber assembly.

2. The system of claim 1, at least one of said valve means having a member responsive to fluid pressure generated in said second fluid pressurizing chamber and operative, when no fluid pressure is received by said at least one of said valve means as a result of fluid pressurization in said first fluid pressurizing chamber, to pressurize said third circuit from said second fluid pressurizing chamber and said second circuit through said at least one valve means.

3. The system of claim 2, said at least one valve means including said first valve means.

4. The system of claim 2, said at least one valve means including said second valve means.

5. The system of claim 1, said second wheel cylinder receiving pressurized fluid from said first fluid pressurizing chamber and tending to energize said other wheel brake assembly independently of fluid pressure energization of said first wheel cylinder.

6. The system of claim 1, said third circuit initially receiving pressurized fluid from said second fluid pressurizing chamber through at least one of said valve means concurrently with said second wheel cylinder and said fluid pressure valve closing chamber receiving pressurized fluid from said first fluid pressurizing chamber, pressure in said first circuit subsequently acting on said at least one of said valve means to fluid disconnect said third circuit and said second fluid pressurizing chamber.

7. A method of vehicle brake operation comprising the steps of simultaneously initially pressurizing a first vehicle brake from a first pressure source and pressurizing a second vehicle brake from a second pressure source, subsequently discontinuing pressurization of the second brake from the second pressure source, further pressurizing the first brake from the first pressure source and further pressurizing the second brake by means of force generated by the braking action of the first brake, and reinstating pressurization of the second brake by the second pressure source when the second pressure source pressure exceeds the second brake pressure by a predetermined pressure difference.

8. The method of claim 7 in which completion of the step of discontinuing pressurization of the second brake from the first pressure source occurs substantially concurrently with the commencement of the step of further pressurizing the first brake from the first pressure source and further pressurizing the second brake by means of force generated by the braking action of the first brake.

9. The method of claim 7 in which the step wherein the pressurization of the second brake is discontinued from the second pressure source occurs at a predetermined first pressure source pressure.

10. The method of claim 9 wherein the step of reinstating pressurization of the second brake includes the application of brake force to the first brake acting through means which generated the further pressurization of the second brake by means of force generated by the braking action of the first brake, the braking force resulting from this pressurization of the first brake being in addition to any braking force generated in the first brake by pressure from the first pressure source.

References Cited

UNITED STATES PATENTS

| | | | |
|---|---|---|---|
| 2,207,173 | 7/1940 | Geepfrich | 188—152 |
| 2,321,479 | 6/1943 | Freeman | 188—152 |
| 3,194,019 | 7/1965 | Lepelletier | 188—152 X |
| 3,303,909 | 2/1967 | Zimmerman | 188—152 |

FOREIGN PATENTS

| | | |
|---|---|---|
| 951,602 | 3/1964 | Great Britain. |

MILTON BUCHLER, *Primary Examiner.*

G. E. HALVOSA, *Assistant Examiner.*